United States Patent [19]

Miyamori et al.

[11] Patent Number: 4,473,705

[45] Date of Patent: Sep. 25, 1984

[54] PROCESS FOR PRODUCING OXALATE DIESTER

[75] Inventors: Hiroshi Miyamori; Tadashi Simomura, both of Chiba; Mituo Miura; Katsushige Hayashi, both of Tokyo, all of Japan

[73] Assignee: Mitsubishi Gas Chemical Company, Inc., Tokyo, Japan

[21] Appl. No.: 451,846

[22] Filed: Dec. 21, 1982

[30] Foreign Application Priority Data

Dec. 23, 1981 [JP] Japan .................................. 56-208597

[51] Int. Cl.$^3$ ........................................... C07C 67/36
[52] U.S. Cl. .................................... 560/193; 502/310; 502/312; 502/311; 502/312; 502/313; 502/313; 502/314; 502/314; 502/319; 502/321; 502/319; 502/326; 502/321; 502/349; 502/326; 502/349; 502/350; 502/350; 502/352; 502/352; 502/353; 560/204; 502/353; 502/185; 502/209; 502/210; 502/211; 502/213; 502/214; 502/215; 502/240; 502/241; 502/242; 502/246; 502/247; 502/248; 502/254; 502/255; 502/257; 502/260; 502/261; 502/262; 502/304; 502/308; 502/309

[58] Field of Search ............... 560/204, 193; 502/185, 502/209, 210, 211, 213, 214, 215, 240, 241, 242, 246, 247, 248, 254, 255, 257, 260, 261, 262, 304, 308, 309, 310, 311, 312, 313, 314, 319, 321, 326, 349, 350, 352, 353

[56] References Cited

U.S. PATENT DOCUMENTS 3,393,136  7/1968  Fenton et al. ..................... 204/59
4,229,589  10/1980  Nishimura et al. ................. 560/193

*Primary Examiner*—Natalie Trousof
*Assistant Examiner*—Vera C. Clarke
*Attorney, Agent, or Firm*—Fleit, Jacobson, Cohn & Price

[57] ABSTRACT

A process for producing an oxalate diester is provided. The oxalate diester is produced by reacting an aliphatic alcohol, carbon monoxide and molecular oxygen at an elevated temperature and under pressure in the presence of a catalyst comprising (1) metallic palladium or a palladium compound, (2) a heteropoly-acid and (3) at least one nitrogen compound selected from the group consisting of nitric acid, nitrogen oxides and esters of nitrous acid.

19 Claims, No Drawings

PROCESS FOR PRODUCING OXALATE DIESTER

BACKGROUND OF THE INVENTION

Field of the Invention

The present invention relates to a process for producing an oxalate diester by reacting an aliphatic alcohol, carbon monoxide and molecular oxygen in the presence of a novel catalyst. More particularly, the invention relates to a process for producing an oxalate diester by using a catalyst consisting essentially of metallic palladium or a palladium compound, a heteropoly-acid and a nitrogen compound.

An oxalate diester is hydrolyzed to form oxalic acid. An oxalate diester is used as a reagent for analysis and a solvent for perfume, and as intermediates for preparing organic compounds, such as ethylene glycol, oxamide, etc. Therefore, oxalate diesters are important compounds from industrial point of view.

In the prior art, a process for producing oxalate diesters comprising reacting an alcohol, carbon monoxide and molecular oxygen have been proposed in U.S. Pat. No. 3,393,136 dated July 16, 1968. The above known process comprises reacting an alcohol, carbon monoxide and molecular oxygen, under substantially anhydrous conditions, in the presence of a dehydrating agent, such as ortho ethyl formate and by using a catalyst comprising a platinum group metal, or a soluble salt or chelate compound thereof and a redox salt selected from the group consisting of soluble cupric and ferric salts. However, according to the process, a great amount of by-products are not only formed with an oxalate diester and selectivity for the oxalate diester is low, but also a dehydrating agent, such as ortho ethyl formate, has to be used. This is unpreferable from an industrial point of view.

Many catalysts for the reaction of an alcohol, carbon monoxide and molecular oxygen have been proposed. The catalysts are classified into the following two groups:

(1) (i) a platinum group metal, such as palladium, or a salt thereof, and (ii) (a) a copper or iron salt and a carbonate, a nitrate, a sulfate or a hydroxide of an alkali metal or an alkaline earth metal or (b) a copper or iron salt, a carbonate, a nitrate, a sulfate or a hydroxide of an alkali metal or an alkaline earth metal, and a tertiary amine, pyridine, urea or acetyl acetone; and (2) palladium or its salt and nitric acid or an alkyl nitrite (refer to Japanese Patent Publication (Kokai) Nos. 15313/1978 and 41813/1979). However, in these processes, the oxalate diester is formed at a slow rate and at a low selectivity.

The catalyst comprising a palladium salt and a copper salt is also unsatisfactory; during the reaction, the copper salt undesirably reacts with the oxalate diester that has been produced in the reaction, and as a result, a copper oxalate precipitate is formed that causes a sudden drop in the activity of the catalyst. Furthermore, the copper oxalate precipitate is difficult to recover and regenerate for reuse. In the conventional technique, copper halide is primarily used as the copper salt, but the corrosive halogen component often attacks the reactor. U.S. Pat. No. 4,229,589 discloses a process for preparing an oxalic acid diester by bringing carbon monoxide into contact with a nitrous acid ester in liquid phase in the presence of metallic palladium or a salt thereof. This process solves the two problems, i.e. reduced catalytic activity and corrosion of the reactor, with the use of copper salt. But to achieve an industrially acceptable reaction rate, a large amount of the nitrous acid ester must be used, and this increases the chance of the formation of a by-product during the reaction and subsequent distillation step, which is certainly unsatisfactory from a commercial viewpoint.

We have screened many compounds in our search for a new catalyst that is free from the above described defects, and finally we found that when a heteropoly-acid and a certain nitrogen compound are used together with metallic palladium or a palladium compound as catalyst components, the intended reaction proceeds smoothly and the end compound, oxalate diester, is produced at high rate and with high selectivity.

SUMMARY OF THE INVENTION

The present invention provides a process for producing an oxalate diester by reacting an aliphatic alcohol, carbon monoxide and molecular oxygen at an elevated temperature and under pressure in the presence of a catalyst consisting essentially of (1) metallic palladium or a palladium compound, (2) a heteropoly-acid and (3) at least one nitrogen compound selected from among nitric acid, nitrogen oxides and nitrous acid esters.

The hetropoly-acid used as one component of the catalyst has acid-base catalytic activity and oxidation-reduction catalytizing activity and is known to be capable of being used as a catalyst for various synthesis reactions. It is also known that a catalyst composed of a palladium compound (e.g. $PdCl_2$) and a heteropoly-acid can be used as a catalyst for oxidation reaction such as the synthesis of acetaldehyde by oxidation of ethylene (J. Synthetic Organic Chem., JAPAN, vol. 39, No. 5, 1981). But no literature has disclosed or suggested the effectiveness of this catalyst in the CO coupling reaction contemplated by the present invention wherein an alcohol is reacted with carbon monoxide in the presence of oxygen to produce an oxalate diester. The catalyst used in the present invention greatly differs from the conventional copper salt using catalyst: it does not react with the end compound (oxalate diester) and will not deteriorate; the spent catalyst can be easily regenerated for further use; it has high reaction rate and selectivity for the production of oxalate diester. For these reasons, the catalyst of the present invention will prove very useful in industrial applications.

DETAILED DESCRIPTION OF THE INVENTION

One component of the catalyst used in the present invention is metallic palladium or a palladium compound. The palladium compound may typically be organic and inorganic palladium salts or palladium complexes. Examples of the salts include palladium nitrate, palladium sulfate, palladium halide such as palladium bromide, palladium chloride and palladium iodide, palladium acetate and the like. These metallic palladium or palladium compounds may be or may not be supported on a carrier, such as alumina, silicagel, carbon, activated carbon, diatomaceous earth and the like. Of the palladium compounds described above, palladium sulfate has most high catalytic activity, and thus, it may be advantageously used in combination with the other components.

The amount of metallic palladium or palladium compound employed is not critical and can be used over a wide range of concentration. Usually, it is used in an amount of less than 100 milligram atom as palladium, preferably, 0.01–100 milligram atom as palladium, and more preferably, 0.1–20 milligram atom as palladium per 1 l of the alcohol employed as a starting material (or 1 l of total amount of an alcohol and an inert solvent, when an inert solvent is used).

Another component of the catalyst used in the present invention is a heteropoly-acid (hereinafter referred to as HPA), and this is represented by the following formula:

$$H_n[L_xM_yO_z] \cdot mH_2O$$

wherein L is a hetero atom such as P, As, Ti, Si, Ge, Sn, Zr, Th, Ce, B, I, Te, Fe, Cr, Al, Co, Ni, Rh, Cu, Mn, Se or Y; M is at least one metal derived from a parent acid such as Mo, W, V, Nb, Ta or Re; n depends on a valence number of L; m is mol number of $H_2O$ involved; x is 1 or 2, y is an integer to bring the ratio of y/x to within the range of from 6 to 12; and z is an integer of from 24 to 56.

Illustrative heteropoly-acids include $H_3[PMo_{12}O_{40}]$, $H_4[SiMo_{12}O_{40}]$, $H_4[GeMo_{12}O_{40}]$, $H_5[PMo_{10}V_2O_{40}]$, $H_7[AsMo_{12}O_{42}]$, $H_6[TeMo_6O_{24}]$, and $H_3[PMo_6W_6O_{40}]$.

Useful heteropoly-acids having the above formula are those wherein L is P or Si and M is Mo. Particularly useful heteropoly-acids are those having the formula:

$$H_{8-n}[LMo_{12}O_{40}] \cdot mH_2O \text{ or } H_{12-n}[LMo_{12}O_{42}] \cdot mH_2O$$

wherein L is P or Si, and n is the valence number of L. Preferred examples are $H_3[PMo_{12}O_{40}]$, and $H_4[SiMo_{12}O_{40}]$.

As in the case of metallic palladium or palladium compound, the HPA can be used over a wide range of concentration. Usually, it is contained in an amount of $1 \times 10^{-8}$ to 1 mol per 1 l of the alcohol employed as a starting material or per 1 l of total amount of the alcohol and an inert solvent, preferably in an amount of $1 \times 10^{-4}$ to $1 \times 10^{-2}$ mol per 1 l of the alcohol employed as a starting material or per 1 l of total amount of the alcohol and an inert solvent. The intended reaction will proceed when less than $1 \times 10^{-8}$ mol/l of HPA, but its catalytic activity is undesirably low, and even if more than 1 mol/l of HPA is used, there is no commensurate increase in the reaction rate and selectivity for the oxalate diester.

The above listed HPAs can be prepared by a known method. For instance, dodecamolybdophosphoric acid can be prepared by following the reaction scheme (see "A New Course in Experimental Chemistry" ed. by the Chemical Society of Japan, vol. 8, "Synthesis of Organic Compounds (III)", page 1414):

$$H_3PO_4 + 12MoO_3 \rightarrow H_3[PMo_{12}O_{40}](aq).$$

Commercial products of HPA may also be used. The HPAs are, generally, used in the form of isolated crystals, but if desired, they may be used as solution.

Still another component of the catalyst used in the present invention is a nitrogen compound. Examples of the nitrogen compound include fuming nitric acid; nitrogen oxides, such as nitrogen monoxide, nitrogen dioxide, dinitrogen trioxide, dinitrogen tetroxide and dinitrogen pentoxide; and a nitrous acid ester of a monohydric saturated aliphatic alcohol, such as methyl nitrite, ethyl nitrite, butyl nitrite, and amyl nitrite. Nitrogen monoxide, nitrous acid esters and fuming nitric acid are industrially advantageous. In general, the nitrogen compound may be used alone or as a mixture. The amount of the nitrogen compound may be varied over a wide range, and it may usually be in the range of about 0.01 mol to about 0.5 mol per 1 l of the alcohol employed as a starting material or per 1 l of total amount of the alcohol and an inert solvent, and preferably 0.05 mol to 0.3 mol per 1 l of the alcohol employed as a starting material or per 1 l of total amount of the alcohol and an inert solvent from the viewpoint of the reaction rate and selectivity. If a large amount of the nitrogen compound is used, carbon dioxide ($CO_2$) and by-product such as acetal, etc. by oxidation of alcohol employed are increased.

Batchwise reaction for producing an oxalate diester by using the catalyst of the present invention is conducted in the following manner: first, predetermined amounts of metallic palladium or palladium compound, HPA and nitrogen compound are added to or dissolved in the alcohol feed in a reactor such as an autoclave, which is also fed with carbon monoxide only (to be supplemented with oxygen during the reaction under stirring) or its mixture with oxygen to a predetermined pressure; then, the reactants are heated at a predetermined temperature for a predetermined period under stirring. Continuous reaction is effected by the following procedure: a mixture of metallic palladium or palladium compound, HPA and nitrogen compound as dissolved or suspended in the alcohol feed is continuously supplied to the reactor by a pump or suitable means while at the same time, a carbon monoxide/oxygen mixture is fed to the reactor by a compressor.

The aliphatic alcohol used in the present invention is a saturated monohydric alcohol. The saturated monohydric alcohol may be a linear, branched or cyclic aliphatic alcohol, and it may include a substituent such as an alkoxy group. Examples of the suitable aliphatic alcohol include methanol, ethanol, n-propanol, iso-propanol, n-butanol, iso-butanol, sec-butanol, pentanol, hexanol, octanol, decanol, cyclohexanol and cyclopentanol, as well as other alkoxy-containing compounds such as ethylene glycol monomethyl ether, propylene glycol monoethyl ether and diethylene glycol monoethyl ether. These alcohols may be used in an amount in excess of the stoichiometrically required amount, and by so doing, they also serve as the reaction solvent. To prevent side reactions and increase the selectivity for oxalate diester and reaction rate, other inert organic solvents may preferably be used. Examples of the inert solvent include aromatic hydrocarbons, such as benzene, toluene, xylene, mesitylene, and pseudocumene; ethers, such as diisopropyl ether, dibutyl ether, tetrahydrofuran, and ethylene glycol diethyl ether; aliphatic hydrocarbons, such as n-hexane, n-heptane, and cyclohexane; ketones, such as acetone, methyl ethyl ketone and acetophenone; esters, such as butyl formate, methyl acetate, ethyl acetate, butyl acetate, ethyl propionate, butyl propionate, dibutyl oxalate, diethyl malonate, methyl benzoate, ethyl benzoate, dimethyl phthalate, diethyl phthalate and dimethyl adipate; phosphates, such as tributyl phosphate, triphenyl phosphate, and tricresyl phosphate; carbonates, such as dimethyl carbonate, diethyl carbonate and dibutyl carbonate; sulfones such as sulforan; mono-, di- and tri-chlorobenzenes; nitrobenzene, and the like. Of these solvents, the esters are especially preferred.

These solvents may be used in combination with the alcohol feed. The usable inert solvent is not limited to the above listed examples, and any other solvent can be used if it is effective for and will not be detrimental to the reaction contemplated by the present invention. There is no particular limitation on the amount of these inert solvents used, but it is advantageous to use them in a volume from 1 to 15 times as great as that of the alcohol feed.

There is also no particular limitation on the pressure of the carbon monoxide used, and generally, it ranges from atmospheric pressure to about 150 kg/cm$^2$G. The intended reaction will proceed when the pressure is more than 150 kg/cm$^2$G, but there is no particular advantage in using such high pressures. If the pressure is subatmospheric, more carbonate ester is produced as by-product and the selectivity for the oxalate diester is decreased. Preferably, carbon monoxide is supplied at a pressure of about 50 kg/cm$^2$G to about 150 kg/cm$^2$G. The carbon monoxide used in the present invention need not be pure and may contain carbon dioxide, nitrogen, hydrogen or other impurities.

The molecular oxygen used in the present invention may include pure oxygen gas, oxygen enriched gas and a mixture of oxygen and nitrogen, namely air. The amount of molecular oxygen employed depends on the reaction rate of the alcohol employed as a starting material. In batchwise reaction, however, molecular oxygen has to be introduced into the reaction system so as not to form an explosive mixture. In general, oxygen gas or air may be introduced into the reactor under a partial pressure of less than 4% of the desired total pressure at a certain interval. Also, carbon monoxide containing not more than 4 vol. % of oxygen may be introduced into the reactor in the same manner. In continuous reaction, carbon monoxide containing not more than 4 vol. % of oxygen may be supplied continuously to the reactor.

The reaction temperature may be in the range of about 30°–200° C. The reaction temperature in the range of 40°–150° C. is preferred in respect of the reaction rate and selectivity for oxalate diester.

The reaction time depends on the kind of an alcohol employed, the amount of catalyst employed and the reaction conditions. In general, the reaction time is set so as to obtain conversion of an alcohol between several percent and about 20% in respect of selectivity to oxalate diester. Such conversion of an alcohol can be achieved in several minutes to several hours from the start of the reaction. When an inert solvent is used, any conversion of an alcohol can be selected. In this case the reaction time depends on the selected conversion of an alcohol decided.

The reaction method may be continuously or batchwise carried out. After the reaction is completed, the resulting oxalate diester can be recovered from the reaction mixture by distillation.

As explained above, when the present catalyst is used, the reaction can be carried out at relatively low temperature and under low pressure without using a specific dehydrating agent, and oxalate diester is formed at a high rate and with a high selectivity.

The present invention is further illustrated by the following Examples. However, this invention is not limited by these examples, and changes and modifications within the spirit and scope of this invention can be effected.

In these examples, selectivity means ratio of mol of object product obtained to mol of an alcohol consumed in the reaction.

EXAMPLE 1

A 100 ml stainless steel autoclave equipped with an magnetic agitator, a thermometer, a pressure indicator and a gas inlet tube was charged with 40 ml of n-butanol, 15 mg (0.074 m mol) of palladium sulphate, 0.15 g of dodecamolybdophosphoric acid ($H_3[PMo_{12}O_{40}].17H_2O$) being commercially available and 0.5 ml of butyl nitrite. Carbon monoxide containing 3% by volume of oxygen gas was introduced into the autoclave to a pressure of 70 kg/cm$^2$G. The autoclave was heated to 80° C. The reaction was carried out with stirring for 12 minutes at the same temperature, and then the autoclave was cooled to room temperature. Gas chromatograph (hereinafter referred to as GC) analysis showed that the reaction product contained 6.14 m mol of dibutyl oxalate, 0.226 m mol of dibutyl carbonate, and 0.242 m mol of butyl butyrate. The selectivity for dibutyl oxalate was 92.9% and the dibutyl oxalate was formed at the rate of 0.77 mol/l.hour.

COMPARATIVE EXAMPLE 1

The same procedure as in Example 1 was repeated except that no dodecamolybdophosphoric acid was used and the reaction was carried out for 30 minutes. GC analysis showed that the reaction product contained 1.04 m mol of dibutyl oxalate. The rate of formation of dibutyl oxalate was only 0.05 mol/l.hour.

EXAMPLE 2

(i) Preparation of dodecamolybdosilicic acid [$H_4(SiMo_{12}O_{40}).8H_2O$]

To a solution of NaOH (6 g) in 300 ml of water, 21.3 g of $Na_2SiO_3.9H_2O$ was added. To the resulting solution, 129.6 g of $MoO_3$ was added and the mixture was refluxed for 2 hours with stirring. The reaction mixture was cooled to room temperature and the precipitate was filtered off. The filtrated solution was concentrated to 100 ml at 50°–60° C. to produce a solution of $Na_4SiMo_{12}O_{40}$. The solution was transferred to a separating funnel, mixed with an equal amount of diethyl ether and extracted with a few drops of 35% HCl. The solution separated into 3 layers, the lowest layer being made of an oily etherate of dodecamolybdosilicic acid ($H_4SiMo_{12}O_{40}$). More extractions with HCl were effected until no etherate was formed. The etherate layers were collected and partially freed of ether at 50° C. Water was added to the combined etherate, which was held at 50° C. to completely remove the ether. Subsequently, the etherate was dehydrated at 50° C. to provide solid dodecamolybdosilicic acid.

(ii) Preparation of dibutyl oxalate

The same autoclave as in Example 1 was charged with 40 ml of n-butanol, 15 mg (0.074 m mol) of palladium sulphate, 0.2 g of dodecamolybdosilicic acid obtained in the Preparation (i) and 0.5 ml of butyl nitrite. The autoclave was pressured to 80 kg/cm$^2$G with carbon monoxide. The autoclave was heated to 80° C. Thereafter, oxygen gas was introduced into the autoclave to 3 kg/cm$^2$G. The reaction was carried out for 6 minutes at 80° C. with stirring. After the reaction, GC analysis showed that the reaction product contained 11.38 m mol of dibutyl oxalate, 0.41 m mol of dibutyl carbonate and 0.26 m mol of butyl butyrate. The selectivity for dibutyl oxalate was 94.4% and the dibutyl oxalate was formed at the rate of 2.6 mol/l.hour.

EXAMPLE 3

The same autoclave as in Example 1 was charged with 10 ml of n-butanol, 8 mg ($7.5 \times 10^{-5}$ mol) of metallic palladium, 0.15 g of dodecamolybdosilicic acid prepared in Example 2, 0.5 ml of butyl nitrite and 30 ml of dibutyl oxalate as a solvent. The autoclave was pressured to 80 kg/cm$^2$G with carbon monoxide. The autoclave was heated to 90° C. Thereafter, oxygen gas was introduced into the autoclave to 2.5 kg/cm$^2$G. The reaction was carried out for 12 minutes with stirring. After the reaction, GC analysis showed that the reaction product contained 12.0 m mol of dibutyl oxalate, 0.02 m mol of dibutyl carbonate and trace amounts of butyl butyrate. The selectivity for dibutyl oxalate was 99.8% and the dibutyl oxalate was formed at the rate of 1.5 mol/l.hour.

EXAMPLE 4

(i) Preparation of phospho-6-molybdo-6-tungstic acid [H$_3$(PMo$_6$W$_6$O$_{40}$).8H$_2$O]

To a solution of Na$_2$HPO$_4$.12H$_2$O (16.38 g) in 200 ml of water, 45.05 g of Na$_2$Wo$_4$.2H$_2$O and 33.04 g of Na$_2$MoO$_4$.2H$_2$O were added. The resulting solution was held at 50° C. until it was concentrated to about 100 ml. The solution was then cooled to room temperature, transferred to a separating funnel and mixed with an equal amount of ethyl ether and extracted with a few drops of 35% HCl under mild stirring. The solution separated into 3 layers, the lowest layer being made of an oily yellow etherate product formed on the bottom of the funnel. Ether was removed at 50° C., and after adding 50 ml of water the product was dehydrated at 50° C. to produce a yellow solid material. The obtained material was identified as phospho-6-molybdo-6-tungstic acid by analysis.

(ii) Preparation of dibutyl oxalate

The same autoclave as in Example 1 was charged with 40 ml of n-butanol, 15 mg (0.074 m mol) of palladium sulphate, 0.45 g of phospho-6-molybdo-6-tungstic acid obtained in the Preparation (i) and 0.5 ml of butyl nitrite. The reaction was carried out for 15 minutes by carrying out the procedures similar to those in Example 3. After the reaction, GC analysis showed that the reaction product contained 7.3 m mol of dibutyl oxalate, 0.07 m mol of dibutyl carbonate and 0.24 m mol of butyl butyrate. The selectivity for dibutyl oxalate was 95.9% and the dibutyl oxalate was formed at the rate of 0.73 mol/l.hour.

EXAMPLE 5

The same autoclave as in Example 1 was charged with 40 ml of n-butanol, 7.0 mg (0.03 m mol) of palladium nitrate, 150 mg of dodecamolybdosilicic acid and 0.15 ml of fuming nitric acid. The autoclave was pressured to 80 kg/cm$^2$G with carbon monoxide. The autoclave was heated to 90° C. Thereafter, oxygen gas was introduced into the autoclave to 3 kg/cm$^2$G. The reaction was carried out for 20 minutes with stirring. After the reaction, GC analysis showed that the reaction product contained 10.90 m mol of dibutyl oxalate, 0.39 m mol of dibutyl carbonate, 0.06 m mol of butyl butyrate and 10.48 m mol of carbon dioxide. The selectivity for dibutyl oxalate was 95.2% and the dibutyl oxalate was formed at the rate of 0.82 mol/l.hour.

EXAMPLE 6

The same procedure as in Example 5 was repeated except that 0.36 mg (0.002 m mol) of palladium chloride was used in place of palladium nitrate and the reaction was carried out for 10 minutes. GC analysis showed that the reaction product contained 10.18 m mol of dibutyl oxalate, 0.49 m mol of dibutyl carbonate and 0.05 m mol of butyl butyrate. The selectivity for dibutyl oxalate was 94.9%.

EXAMPLE 7

The same autoclave as in Example 1 was charged with 7.5 ml of methanol, 5 mg of metallic palladium, 0.2 g of phosphomolybdic acid, 0.28 ml of fuming nitric acid and a mixed solvent of dimethyl malonate and dimethyl oxalate in a volume ratio of 6/4. The autoclave was pressured to 85 kg/cm$^2$G with carbon monoxide. The autoclave was heated to 90° C. Thereafter, oxygen gas was introduced into the autoclave to 4 kg/cm$^2$G. The reaction was carried out for 15 minutes with stirring. After the reaction, GC analysis showed that the reaction product contained 12.9 m mol of dimethyl oxalate, 0.2 m mol of dimethyl carbonate and trace amounts of methyl formate. The selectivity for dimethyl oxalate was 99.2% and the dimethyl oxalate was formed at the rate of 1.29 mol/l.hour.

What is claimed is:

1. A process for producing an oxalate diester which comprises reacting an aliphatic alcohol, carbon monoxide and molecular oxygen at an elevated temperature and under pressure in the presence of a catalyst consisting essentially of (1) metallic palladium or a palladium compound, (2) a heteropoly-acid represented by the following formula:

wherein L represents a hetero atom selected from the group consisting of P, As, Ti, Si, Ge, Sn, Zr, Th, Ce, B, I, Te, Fe, Cr, Al, Co, Ni, Rh, Cu, Mn, Se and Y; M represents at least one metal selected from the group consisting of Mo, W, V, Nb, Ta and Re; n depends on the valence number of L; m is mol number of H$_2$O involved; x is 1 or 2 and y is an integer to bring the ratio of y/x to within the range of from 6 to 12; and z is an integer of 24–56 and (3) at least one nitrogen compound selected from the group consisting of nitric acid, nitrogen oxides and esters of nitrous acid.

2. The process as claimed in claim 1, wherein component (1) of the catalyst is selected from the group consisting of metallic palladium nitrate, palladium sulfate, palladium halide and palladium acetate.

3. The process as claimed in claim 1, wherein component (1) of the catalyst is supported on a carrier.

4. The process as claimed in claim 3, wherein the carrier is selected from the group consisting of alumina, silicagel, carbon, activated carbon and diatomaceous earth.

5. The process as claimed in claim 1, wherein the hetero atom is selected from the group consisting of P and Si, and the metal, M, is Mo.

6. The process as claimed in claim 1, wherein component (2) of the catalyst is selected from the group consisting of the compounds represented by the following formulas:

$$H_{8-n}[LMo_{12}O_{40}] \cdot mH_2O \text{ and}$$
$$H_{12-n}[LMo_{12}O_{42}] \cdot mH_2O$$

wherein L is selected from the group consisting of P and Si; n is the valence number of L; and m is a mol number of $H_2O$ involved.

7. The process as claimed in claim 1, wherein component (2) of the catalyst is selected from the group consisting of the compounds having the following formulas:

$$H_3[PMo_{12}O_{40}], \text{ and}$$

$$H_4[SiMo_{12}O_{40}].$$

8. The process as claimed in claim 1, wherein component (3) is selected from the group consisting of fuming nitric acid, nitrogen monoxide, nitrogen dioxide, dinitrogen trioxide, dinitrogen tetraoxide, dinitrogen pentaoxide, and nitrous acid esters of monohydric saturated aliphatic alcohols.

9. The process as claimed in claim 1, wherein the aliphatic alcohol is a saturated monohydric alcohol.

10. The process as claimed in claim 9, wherein the saturated monohydric alcohol is selected from the group consisting of linear, branched and cyclic aliphatic alcohols which may include a substituent.

11. The process as claimed in claim 1, wherein the molecular oxygen is introduced in the form of pure oxygen gas, oxygen enriched gas or air into the reaction system.

12. The process as claimed in claim 1, wherein the reaction is carried out in the presence of an inert organic solvent.

13. The process as claimed in claim 12, wherein the inert organic solvent is selected from the group consisting of aromatic hydrocarbons, carbonates, esters, ethers and ketones.

14. The process as claimed in claim 12, wherein the inert organic solvent is used in a volume from 1 to 15 times as great as that of the alcohol feed.

15. The process as claimed in claim 1, wherein component (1) is used in an amount ranging from 0.01 to 100 mg atom, calculated as metallic palladium, per 1 liter of the alcohol employed as a starting material.

16. The process as claimed in claim 1, wherein component (2) is used in an amount ranging from $1 \times 10^{-8}$ mol to 1 mol per 1 l of the alcohol employed as a starting material or per 1 l of the total amount of the alcohol and an inert solvent.

17. The process as claimed in claim 1, wherein component (3) is used in an amount ranging from 0.01 mol to 0.5 mol per 1 l of the alcohol employed as a starting material or per 1 l of the total amount of the alcohol and an inert solvent.

18. The process as claimed in claim 1, wherein the reaction is carried out at a partial pressure of carbon monoxide in the range of 50 kg/cm$^2$(gauge) to 150 kg/cm$^2$(gauge).

19. The process as claimed in claim 1, wherein the reaction is carried out at a temperature between 30° C. and 200° C.

* * * * *